United States Patent
Walker et al.

(10) Patent No.: US 8,719,766 B1
(45) Date of Patent: May 6, 2014

(54) SYSTEM AND METHOD FOR IDENTIFYING AND ADDING FILES TO A PROJECT MANIFEST

(75) Inventors: Gavin William Walker, Cambridge (GB); Malcolm Alexander Wood, Edinburgh (GB); Robert O. Aberg, South Grafton, MA (US)

(73) Assignee: The Math Works, Inc., Natick, MA (US)

( * ) Notice: Subject to any disclaimer, the term of this patent is extended or adjusted under 35 U.S.C. 154(b) by 1337 days.

(21) Appl. No.: 11/582,064

(22) Filed: Oct. 16, 2006

(51) Int. Cl.
G06F 9/44 (2006.01)

(52) U.S. Cl.
USPC .................. 717/100; 717/102; 717/104

(58) Field of Classification Search
None
See application file for complete search history.

(56) References Cited

U.S. PATENT DOCUMENTS

| | | | |
|---|---|---|---|
| 5,675,802 A * | 10/1997 | Allen et al. | 717/103 |
| 5,724,589 A * | 3/1998 | Wold | 719/318 |
| 5,740,444 A * | 4/1998 | Frid-Nielsen | 717/102 |
| 5,897,642 A * | 4/1999 | Capossela et al. | 1/1 |
| 5,911,075 A * | 6/1999 | Glaser et al. | 717/100 |
| 5,946,677 A * | 8/1999 | Bullen | 707/700 |
| 5,950,000 A * | 9/1999 | O'Leary et al. | 717/105 |
| 5,956,513 A * | 9/1999 | McLain, Jr. | 717/142 |
| 5,974,391 A * | 10/1999 | Hongawa | 705/7 |
| 6,006,195 A * | 12/1999 | Marchak et al. | 705/9 |
| 6,078,743 A * | 6/2000 | Apte et al. | 717/100 |
| 6,112,024 A * | 8/2000 | Almond et al. | 717/122 |
| 6,145,119 A * | 11/2000 | House et al. | 717/101 |
| 6,182,274 B1 * | 1/2001 | Lau | 717/104 |
| 6,202,200 B1 * | 3/2001 | House et al. | 717/100 |
| 6,212,673 B1 * | 4/2001 | House et al. | 717/100 |
| 6,247,020 B1 * | 6/2001 | Minard | 1/1 |
| 6,256,772 B1 * | 7/2001 | Apte et al. | 717/100 |
| 6,279,151 B1 * | 8/2001 | Breslau et al. | 717/140 |
| 6,289,502 B1 * | 9/2001 | Garland et al. | 717/104 |
| 6,405,364 B1 * | 6/2002 | Bowman-Amuah | 717/101 |
| 6,505,342 B1 * | 1/2003 | Hartmann et al. | 717/104 |
| 6,766,334 B1 * | 7/2004 | Kaler et al. | 1/1 |
| 7,003,759 B2 * | 2/2006 | Jameson | 717/120 |
| 7,111,280 B2 * | 9/2006 | Levien et al. | 717/120 |
| 7,171,646 B2 * | 1/2007 | Charisius et al. | 717/100 |
| 7,370,315 B1 * | 5/2008 | Lovell et al. | 717/100 |
| 7,458,062 B2 * | 11/2008 | Coulthard et al. | 717/121 |

(Continued)

OTHER PUBLICATIONS

"IAR IDE User Manual Rev. 1.2", Texas Instruments, 2006, <http://www.ti.com/lit/ug/swru038/swru038.pdf>, pp. 1-29.*

(Continued)

*Primary Examiner* — Thuy Dao
*Assistant Examiner* — Samuel Hayim
(74) *Attorney, Agent, or Firm* — Nelson Mullins Riley & Scarborough LLP

(57) ABSTRACT

A mechanism for identifying and adding files to a project manifest is discussed. A combination of techniques is used in order to identify the files that should be listed in a project manifest. The combined techniques include the programmatic examination of a storage location marked as associated with a project to identify project files. The identified files are automatically added to a project manifest. In one embodiment the identified files are subjected to filtering criteria before being added to the project manifest. In addition, embodiments of the present invention perform a static analysis of at least one file associated with the project to identify file dependencies. The identified files are also added to the project manifest. The integrated development environment (IDE) also provides a user interface enabling a user to manually add files to the project manifest.

42 Claims, 4 Drawing Sheets

(56) References Cited

U.S. PATENT DOCUMENTS

| | | | |
|---|---|---|---|
| 2001/0037494 A1* | 11/2001 | Levien et al. ..................... 717/5 |
| 2002/0016953 A1* | 2/2002 | Sollich ............................... 717/1 |
| 2002/0032900 A1* | 3/2002 | Charisius et al. ................. 717/2 |
| 2002/0066071 A1* | 5/2002 | Tien et al. ....................... 717/102 |
| 2002/0091990 A1* | 7/2002 | Little et al. ..................... 717/105 |
| 2002/0104071 A1* | 8/2002 | Charisius et al. ............. 717/102 |
| 2002/0198770 A1* | 12/2002 | Jameson .......................... 705/14 |
| 2002/0199170 A1* | 12/2002 | Jameson ....................... 717/120 |
| 2003/0041311 A1* | 2/2003 | Poole et al. ................... 717/100 |
| 2003/0163799 A1* | 8/2003 | Vasilik et al. ................. 717/100 |
| 2003/0192027 A1* | 10/2003 | Porter ........................... 717/100 |
| 2004/0003119 A1* | 1/2004 | Munir et al. .................. 709/246 |
| 2004/0003371 A1* | 1/2004 | Coulthard et al. ............ 717/101 |
| 2004/0034846 A1* | 2/2004 | Ortal et al. .................... 717/111 |
| 2004/0117759 A1* | 6/2004 | Rippert et al. ................ 717/100 |
| 2005/0114771 A1* | 5/2005 | Piehler et al. ................. 715/536 |
| 2006/0048094 A1* | 3/2006 | Kipman et al. ............... 717/104 |
| 2006/0156272 A1* | 7/2006 | Goncharenko et al. ....... 717/100 |
| 2007/0011620 A1* | 1/2007 | Mendel et al. ................ 715/762 |

OTHER PUBLICATIONS

Ahmed F. Hegazi et al., "Visual Craft: A Visual Integrated Development Environment", IEEE, 1997, <http://ieeexplore.ieee.org/stamp/stamp.jsp?tp=&arnumber=615998>, pp. 210-214.*

Thomas Vestdam, "Elucidative Programming in Open Integrated Development Environments for Java", PPPJ, 2003, <http://delivery.acm.org/10.1145/960000/957306/p49-vestdam.pdf>, pp. 49-54.*

* cited by examiner

SYSTEM AND METHOD FOR IDENTIFYING AND ADDING FILES TO A PROJECT MANIFEST

BACKGROUND

Integrated Development Environments (IDEs) are programming environments, including modeling environments, that are integrated into a software application. The IDEs allow code to be developed and debugged. The programming environments may be textual as well as graphical. The programming environments may be part of one application that allows multiple simultaneous views or they may be stand-alone applications such as, for example, Emacs, that combine with one or more other applications such as a C compiler, to form an IDE. Some IDEs support the concept of a 'project'. A project is a collection of files that a user has decided to group together for a purpose. Frequently, the project files are all associated with a common graphical or textual model being developed by a user or users. Many tasks that can be performed on individual files are much more powerful when they are instead performed on all the files in a project. Examples of tasks that can benefit from being performed on all the files in a project include coverage tests and reports.

Some of the tasks that are performed on project files require that all of the files in the project be identified in order for the task to be successfully completed. The complete list of files associated with a project is referred to as a 'project manifest'. Two exemplary tasks that require a complete project manifest are the transfer of a project from one user or computer to another user or computer and the placing of the files used by a project under source control and/or configuration management. Existing IDEs require the manual addition of files to a project and project manifest. This manual approach is both time-consuming and less than effective at identifying all of the project files.

BRIEF SUMMARY

Exemplary embodiments described herein provide a mechanism for identifying and adding files to a project manifest with the aim of ensuring that all the files associated with a project are properly listed in the project manifest. A combination of techniques is used in order to identify the files that should be listed in a project manifest. The combined techniques include the programmatic examination of a storage location marked as associated with a project to identify project files. The identified files are automatically added to a project manifest. In one embodiment the identified files are subjected to filtering criteria before being added to the project manifest. In addition, embodiments of the present invention perform a static analysis of at least one file associated with the project to identify file dependencies. The identified files are also added to the project manifest. The IDE also provides a user an interface enabling a user to manually add files to the project manifest. Additionally, in some embodiments, the IDE programmatically adds files created by tasks performed upon the files in the project.

In one embodiment of the present invention a method of identifying and adding files to a project manifest in an Integrated Development Environment (IDE) includes the step of obtaining at least one file associated with a project that includes multiple file dependencies. The method examines a storage location that is associated with the at least one file associated with the project. The examining identifies by filtering multiple files associated with the at least one file associated with the project. The filtered files are added to the project manifest. The method also performs a static analysis of the at least one file associated with the project that identifies and adds to the project manifest at least one additional file that was not included in the files identified by filtering.

In another embodiment of the present invention, a system for identifying and adding files to a project manifest in an Integrated Development Environment (IDE) includes at least one file associated with a project that includes multiple file dependencies. The system also includes a project verification facility that examines a storage location associated with the at least one file. The examining identifies by filtering multiple files that are associated with the at least one file associated with the project. The filtered files are added to the project manifest. The project verification facility also performs a static analysis of the at least one file associated with the project that identifies and adds to the project manifest at least one additional file not identified by examining the storage location. Additionally the system includes a user interface that enables the addition of at least one user-selected file to the project manifest.

In one embodiment a method of identifying and adding files to a project manifest in an Integrated Development Environment (IDE) includes the step of obtaining a model associated with a project. The model includes multiple file dependencies. The method also examines a storage location associated with the model. The examining uses filtering to identify multiple files associated with the model. The identified filtered files are added to the project manifest. The method also performs a static analysis of the model that identifies and adds to the project manifest at least one additional file not in the filtered files. The method additionally adds at least one user-selected file to the project manifest and programmatically adds at least one IDE-selected file to the project manifest.

In an embodiment a method of identifying and adding files to a project manifest in an Integrated Development Environment (IDE) includes the step of obtaining a model associated with a project that includes multiple file dependencies. The method also examines, in a storage location associated with the model, multiple files associated with the model. The examining identifies by filtering multiple files that are then added to the project manifest. The method performs a static analysis of the model that identifies and adds to the project manifest at least one additional file not included in the files previously identified by filtering. Additionally, the method adds at least one user-selected file to the project manifest and adds programmatically at least one IDE-selected file to the project manifest.

In another embodiment a method of identifying and adding files to a project manifest obtains at least one file associated with a project that includes multiple file dependencies. The method also examines, in a storage location associated with the at least one file associated with the project, multiple files associated with the at least one file associated with the project. The examining identifies by filtering files that are then added to the project manifest. The method additionally performs a dynamic analysis of the at least one file associated with the project that identifies and adds to the project manifest at least one additional file not included in the files previously identified by filtering.

In one embodiment a method of identifying and adding files to a project manifest in an Integrated Development Environment (IDE) obtains at least one file associated with a project that includes multiple file dependencies. The method examines a list of files associated with the at least one file associated with the project. The method also excludes a first subset of the list of files from the list of files so as to identify a remaining subset of files that is then added to the project manifest.

In another embodiment a method of identifying and adding files to a project manifest includes the step of obtaining at least one file associated with a project that includes at least one file dependency. The method examines a list of files associated with the at least one file associated with the project so as to identify by filtering multiple files. The files identified by filtering are added to the project manifest. The method also performs a static analysis of the at least one file associated with the project. The static analysis identifies and adds to the project manifest at least one file not included in the files identified by filtering.

BRIEF DESCRIPTION OF THE DRAWINGS

The invention is pointed out with particularity in the appended claims. The advantages of the invention described above, as well as further advantages of the invention, may be better understood by reference to the following description taken in conjunction with the accompanying drawings, in which:

DETAILED DESCRIPTION

Projects are frequently the result of collaboration between multiple users working in widespread locations in separate development environments. Even when the project is not widely distributed to remote locations, it is important that all members of the project team be working on a project that includes the same files and that project based tasks be able to access all or a complete subset of the files associated with the project. The embodiments of the present invention help to ensure the creation of complete project manifests that can be utilized to successfully complete project-based tasks.

Figure 1:
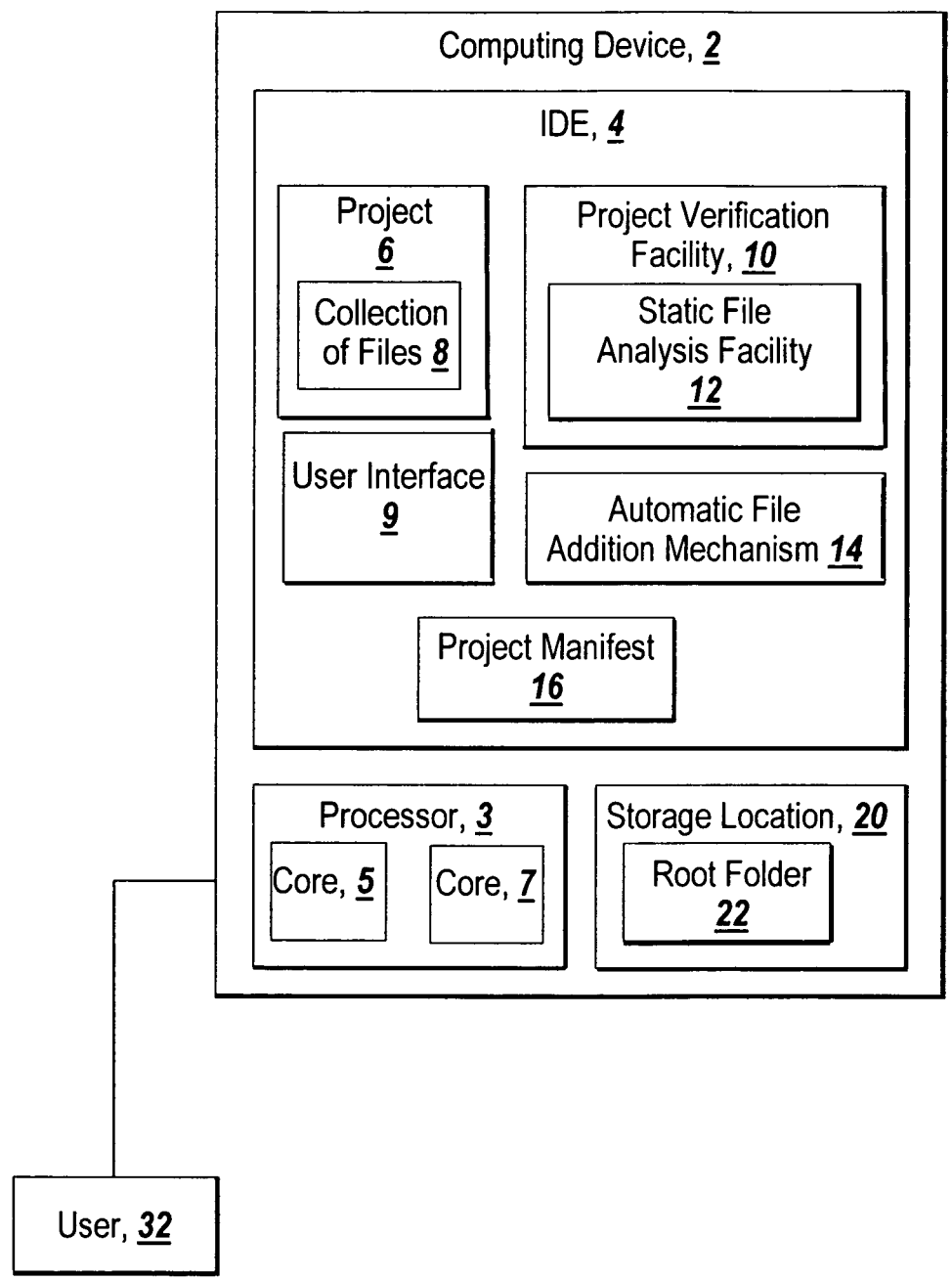
FIG. 1 depicts an environment suitable for practicing an embodiment of the present invention.

FIG. 1 depicts an environment suitable for practicing an embodiment of the present invention. A computing device 2 hosts an Integrated Development Environment (IDE) 4. The computing device 2 hosting the IDE 4 may be a workstation, server, laptop, mainframe, PDA or other computing device equipped with a processor and able to support the single language computing environment 2. The computing device may have a single processor 3 or multiple processors and each of the processors may have one core or multiple cores 5 and 7. Exemplary IDEs 4 include MATLAB and SIMULINK both by The MathWorks, Inc. of Natick, Mass., LABVIEW from National Instruments, Inc. of Austin, Tex. and Visual Studio by Microsoft Corporation of Redmond, Wash. Included in the IDE 4 is at least one project 6. Each project 6 references a collection of files 8. The collection of one or more files 8 may be a model. The collection of files 8 may be a graphical model such as a block diagram, statechart, data flow diagram or alternatively may be the source code for a textual model. Alternatively, in another implementation, the project 6 may reference a collection of files designated by a user or users.

The IDE 4 also includes a project verification facility 10 that is used to construct a project manifest 16 that lists all the files necessary to successfully execute the project 6.

The project manifest data may be stored using XML as depicted in the following exemplary project manifest file:

```
<?xml version="1.0" encoding="utf-8"?>
<project version="1.0">
    <projectname>MyProject</projectname>
    <projectdesc/>
    <datecreated>Sep 11, 2006 1:23:32 PM</datecreated>
    <datemodified>Oct 2, 2006 5:04:19 PM</datemodified>
    <createdby>jsmith</createdby>
    <projectfiles>
        <file>/sandbox/testproject</file>
        <file>/sandbox/testproject2</file>
    </projectfiles>
    <matlabcwd>
        <cwd>/var/automount/mathworks/devel/sandbox/matlab</cwd>
    </matlabcwd>
    <plugins>
        <plugin>matlabpath</plugin>
        <plugin>matlabcwd</plugin>
    </plugins>
</project>
```

The project manifest may also include additional information other than the files required to execute the project. For example, the project manifest 16 may contain version information, configuration information, file property information (such as the information identifying the user who created the project, information identifying the last user to access or modify the project, etc.), a log of changes with comments, and information identifying which root directory(s) were used by the project. Similarly, the project manifest 16 may contain information identifying any include and exclude lists used to establish the project and meta tags indicating what content is contained in the project. Likewise, the project manifest 16 may indicate what the top model is for projects that have a number of models and may contain global workspace parameters. The project manifest 16 may also contain information identifying environment variables such as the system path or application path.

The project verification facility 10 is software operating in the IDE 4 that examines the project 6 to identify the name of the referenced collection of files 8 or model and then examines a storage location 20 on the computing device 2 where the model or collection of files are located. The project verification facility 10 examines the storage location 20, such as a hard drive for the computing device 2, to identify a root folder associated with the project 6. The root folder 6 contains files for the referenced collection of files 8 or referenced model. The root folder 6 may be hierarchical in nature including a number of sub folders. In one embodiment of the present invention, all files within the marked root folder and any sub folders are added to the project manifest 16 by the project verification facility 10. In another embodiment of the present invention, the files within the marked root folder are subjected to filtering criteria to filter out unneeded project files before adding the remaining files to the project manifest 16. The filtering criteria may filter out files belonging in certain directories by name or by the use of wildcards or may exclude certain file extensions as unnecessary. It will be appreciated that other selection criteria may also be used. For example, all files that contain a certain string could be included/excluded in the project. All models that have a certain number of input ports may be included/excluded. All models that require certain software applications to be available may be included/ excluded. All files that have a certain user who last modified them may be included/excluded. All files with a certain version number may be included/excluded. Similarly, all files with a date stamp later than a given date may also be included or excluded. Exemplary filtering commands may be represented as:

exclude.dirs={'sfprj', 'slprj'};
exclude.dirswildcards={'*_rtw'};
exclude.exts={'.asv', '.bak', '.exe', . . . '.mexglx', '.mexw32', '.mexsol', '.mexw64', '.mexa64', 'mex-mac'};

The filtering commands may include path information, relative paths, absolute paths, URLs, fields and tables in a database, and storage locations in repositories addressed in an absolute or relative sense. The paths may be determined from a number of other paths or may be based on system properties. It will be appreciated by those skilled in the art that the storage location 20 may be located at a location accessible to the computing device 2 rather than physically being present on the computing device.

However, since it is frequently the case that not all files related to, and/or needed for, a project are grouped within the root folder, the embodiments of the present invention also perform a static analysis of the collection of files 8 or one or more models referenced by the project 6. To perform the static analysis, the project verification facility 10 includes a static file analysis facility 12. It will be appreciated that the static file analysis facility 12 may be a separate software process called by the project verification facility 10 or may be integrated into and part of the project verification facility. The static file analysis facility 12 performs a static analysis of the collection of files 8 or model referenced by the project 6 in order to determine file dependencies.

For ease of explanation, the term "model" is used herein to refer to one or more models related to the project and it should be understood that the static analysis may be performed on more than one model related to the project. The term "file dependencies" as used herein includes both the files necessary in order for the project to "work" as well as files associated with a project. Thus exemplary file dependencies may also include model references, S-function binaries/M-files and libraries as well as documentation files such as text files that are associated with model elements in addition to those files required for the project to "work". The meaning of 'work' is determined by the user's selection of filtering criteria. For example, the user may require all callback functions to be present or may instead allow some files to be missing from the project even if the project may then lack full functionality when being executed.

The mechanics of the analysis performed on the collection of files 8 or model referenced by the project 6 will vary depending upon the form of the code associated with the collection of files. For example, the code may be code associated with a graphical model, source code associated with a textual model, or an entry point to a set of interdependent files. The static file analysis facility 12 performs the analysis to identify dependencies for the collection of files upon files that are not within the root folder or its subfolders. The identified files are added to the project manifest 16.

In one embodiment of the present invention the IDE 4 includes a user interface 9 through which a user 30 accessing the computing device 2 may examine the files listed in the project manifest 16. The user 30 may then utilize the user interface to manually add files to the project manifest 16 that the user determines should be included in the project manifest but were not added as a result of the examination of the root folder and the performance of the static file analysis.

In an embodiment of the present invention the IDE 4 also includes an automatic file addition mechanism 14. The automatic file addition mechanism 14 is programmatically called by the IDE 4 and examines the project manifest 16 upon the completion of the three techniques discussed above for populating the project manifest. The list of files in the project manifest 16 is compared to a pre-determined list of files and any files appearing on the pre-determined list that are not on the project manifest 16 are added to the project manifest. In one embodiment, the files programmatically added by the IDE 4 to the project manifest are created when a task is performed on the files in the project. For example, the performance of a coverage report creates a number of files that may be added to the project manifest. It should be noted that the automatic file mechanism 14 may be a separate process called by the IDE 4 or may be integrated into IDE. In another embodiment, at least one IDE-selected file may be programmatically subtracted from the project manifest 16. The IDE-selected file may be subtracted from the project manifest after programmatically comparing the name of the IDE-selected file to the list of files in the project manifest and identifying the presence of the IDE-selected file in the project manifest. Files may also be subtracted based on an exclude list.

It should be recognized that although the embodiments of the present invention have been described above as including all four techniques for populating the project manifest with a complete list of project files (examination of root folder, static file analysis, user interface for manual file addition, and programmatic addition of files by the IDE), other combinations of less than all of the four techniques are also considered to be within the scope of the present invention. Similarly, while a specific order of the combined techniques has been discussed above, the techniques may also be performed in a different order or interleaved in different layered combinations which include the repetition of techniques without departing from the scope of the present invention.

Figure 2:
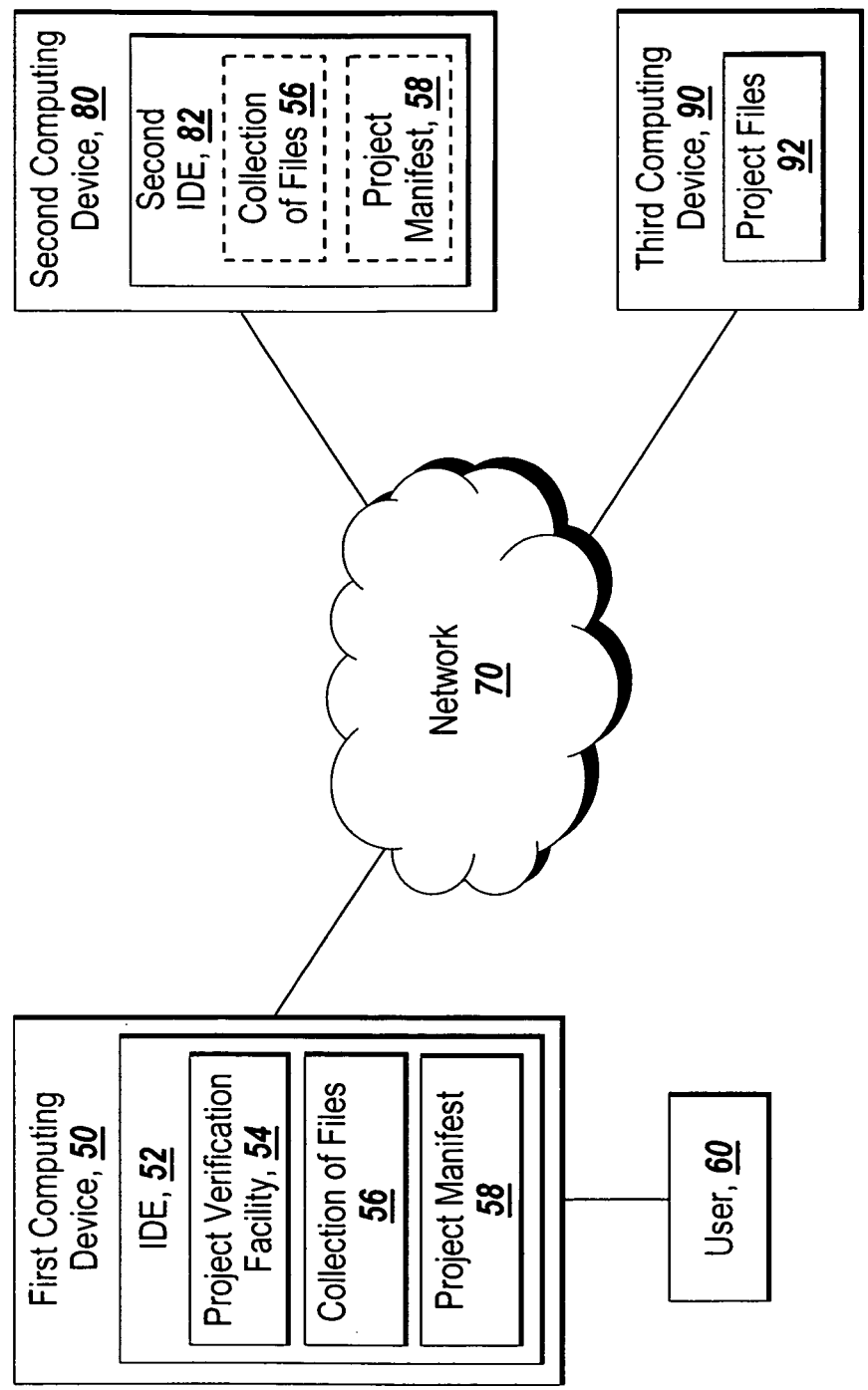
FIG. 2 depicts an alternate distributed environment suitable for practicing an embodiment of the present invention.

As noted above, projects frequently require the collaboration of users that are located remotely from each other. The use of the project manifest created by the embodiments of the present invention is advantageous in such situations. FIG. 2 depicts a distributed environment suitable for practicing an embodiment of the present invention. A first computing device 50 accessed by a user 52 may include an IDE 52. The IDE 52 may include a project verification facility 54 and a collection of files 56 which are used to build a project manifest 58. The first computing device 50 may be in communication with a second computing device 80 and third computing device 90 over a network 70. The network 70 may be the Internet, a local area network (LAN), a wide area network (WAN), a wireless network, an intranet, an extranet or some other type of network. Following the construction of the project manifest 58 in the IDE 52 in the manner outlined above, a copy of the collection of files 56 and the project manifest 58 may be transmitted to a second IDE 82 on the second computing device 80. Upon examination of the project manifest 58 it may become apparent that not all of the files necessary for the project to work or associated with the project are in the second IDE 82. The missing project files 92 may then be located on and retrieved from the third computing device 90 prior to a user attempting to execute the collection of files 56 in the second IDE 82.

Figure 3:
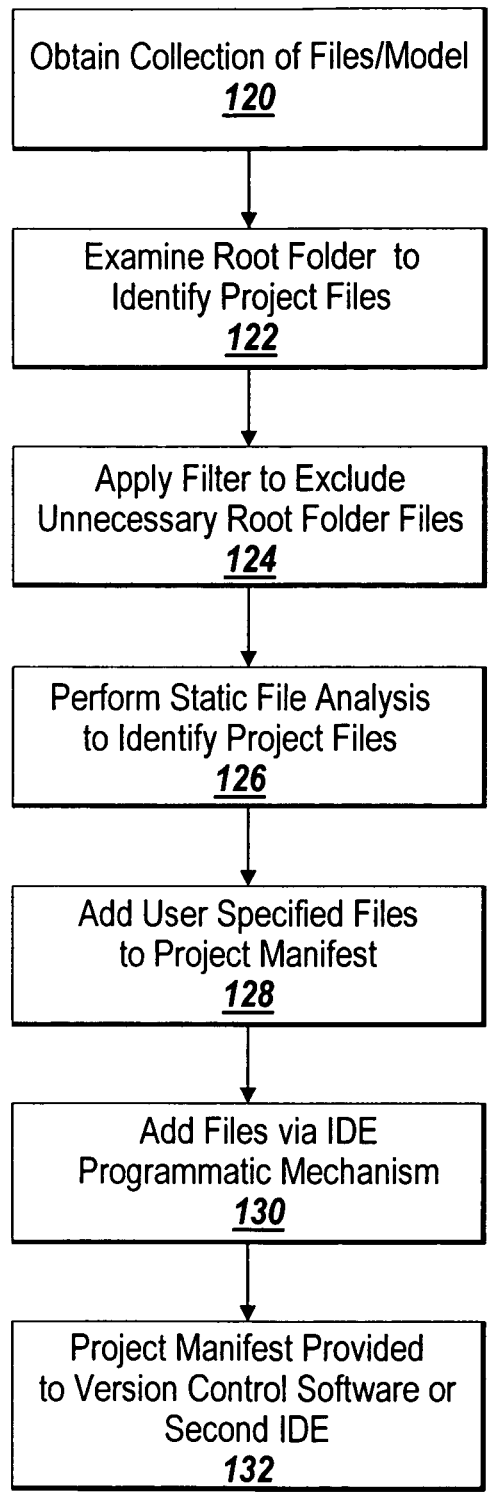
FIG. 3 is a flowchart of a sequence of steps that may be followed by an embodiment of the present invention in order to assemble a complete project manifest.

FIG. 3 is a flowchart of a sequence of steps that may be followed by an embodiment of the present invention in order to assemble a complete project manifest. The sequence begins by examining the project 6 to obtain the model or collection of files referenced by the project (step 120). The project verification facility 10 then examines the root folder in a storage location to identify project files (step 122) and applies filtering criteria to the identified files (step 124). The resulting identified filtered files are then added to the project manifest. Subsequently the static file analysis facility 12 performs a static file analysis on the model or collection of files referenced by the project (step 126). File dependencies that are noted and files not already on the project manifest are added to the project manifest. A user may then examine the project manifest using a provided UI and manually add additional files to the project manifest (step 128). In some embodiments, the IDE may then programmatically compare the compiled project manifest to a pre-determined list of required project files and add any missing files to the project manifest (step 130). Once compiled, the project manifest may be provided to version control software, a second IDE or another desired target (step 132).

Figure 4:
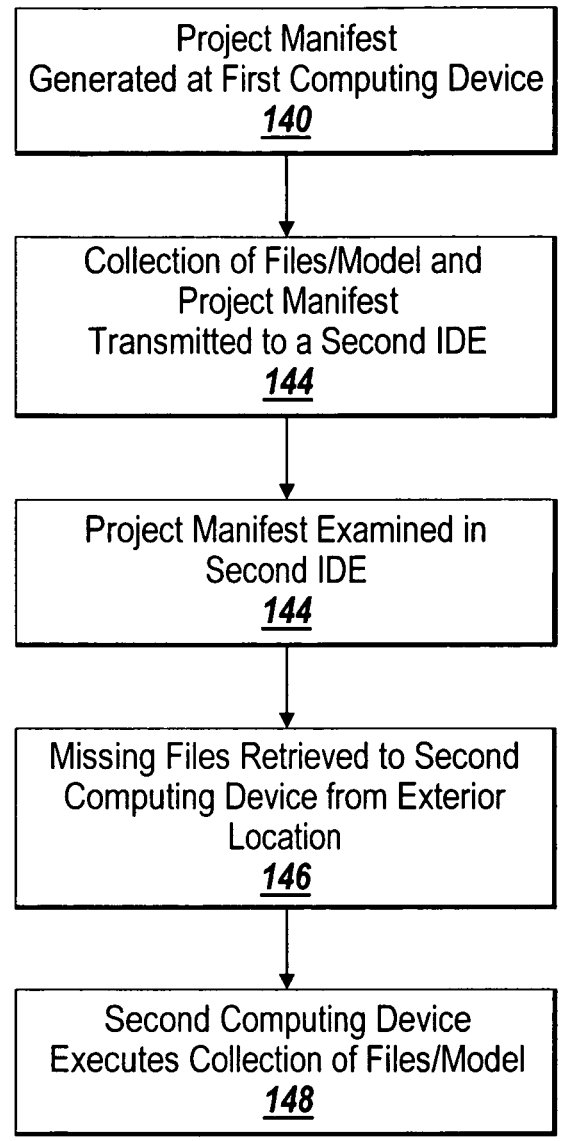
FIG. 4 is a flowchart of a sequence of steps that may be followed by an embodiment of the present invention to use a project manifest in a second Integrated Development Environment.

As discussed above, the project manifest may be utilized for projects that require the collaboration of users utilizing different IDEs. FIG. 4 is a flowchart of a sequence of steps that may be followed by an embodiment of the present invention to use a project manifest in a different IDE from the one in which the project manifest was created. The sequence begins with the project manifest being generated on a first computing device in the manner discussed above (step 140). A model or collection of files referenced by the project and the created project manifest may then be transmitted to a second IDE (step 142). The second IDE may be located on the same or a different computing device. The project manifest is then examined in the second IDE (step 144). In the event that the project manifest indicates files are necessary for the project that are not currently located in the second IDE, the missing files may be retrieved to, or identified for later access from, the second IDE from an exterior location such as a remote location accessible over a network (step 146). Once all the required files have been accumulated, the second IDE may execute the model or collection of files associated with the project (step 148).

In another embodiment, the project manifest may be constructed based on a dynamic analysis. During execution of a model referenced by the project, the dependencies that emerge may be tracked and saved. Subsequently the identified dependencies may be added to the manifest.

The present invention may be provided as one or more computer-readable programs embodied on or in one or more mediums. The mediums may be a floppy disk, a hard disk, a compact disc, a digital versatile disc, a flash memory card, a PROM, an MRAM, a RAM, a ROM, or a magnetic tape. In general, the computer-readable programs may be implemented in any programming language. Some examples of languages that can be used include MATLAB, FORTRAN, C, C++, C#, Python or Java. The software programs may be stored on or in one or more mediums as object code. Hardware acceleration may be used and all or a portion of the code may run on a Field Programmable Gate Array (FPGA), an Application Specific Instruction set Processor (ASIP), or an Application Specific Integrated Circuit (ASIC). The code may run in a virtualized environment such as in a virtual machine. Multiple virtual machines running the code may be resident on a single processor.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

We claim:

1. A computing device-implemented method comprising:
   obtaining in an Integrated Development Environment (IDE) at least one file referenced by a project, where:
      the at least one file includes a plurality of file dependencies,
      the project is associated with an executable graphical model being developed in the IDE,
      the project has a project manifest, the project manifest identifying files associated with the project, and
      the project is executable when associated with the project manifest;
   examining, with a verification facility in the IDE, a plurality of files associated with the at least one file referenced by the project, the plurality of files including files required to execute the project and files not-required to execute the project, the examining comprising:
      identifying a filtered set of files from the files required to execute the project and the files not-required to execute the project;
   adding the filtered set of files to the project manifest;
   automatically performing, without user intervention, a static analysis of the at least one file referenced by the project;
   automatically identifying, without user intervention, at least one additional file not included in the filtered set of files, the automatically identifying based on the static analysis, the automatically identifying comprising:
      retrieving, from storage, the project manifest, and
      adding the at least one additional file, not included in the filtered set of files, to the project manifest, where the project is executable prior to and after the automatic addition of the at least one additional file, not included in the filtered set of files, to the project manifest;
   automatically identifying, without user intervention, at least one IDE-selected file, the least one IDE-selected file created based on performing a task on the at least one file referenced by the project; and
   automatically adding, without user intervention, the at least one IDE-selected file to the project manifest, the project being executable when the at least one IDE-selected file is in the project manifest.

2. The method of claim 1, further comprising;
   adding at least one user-selected file to the project manifest.

3. The method of claim 2, wherein the at least one IDE-selected file is added to the project manifest after programmatically comparing one of a name, a version and an author of the selected file to the files in the project manifest and identifying absence of the IDE-selected file from the list of files in the project manifest.

4. The method of claim 1, wherein a group of files identified by a label is added to the project manifest.

5. The method of claim 4, wherein the label identifies one of an application, an application plug-in, a toolbox and a blockset.

6. The method of claim 5, wherein the label also identifies a version identifier for one of the application, the application plug-in, the toolbox and the blockset.

7. The method of claim 1, wherein the static analysis is performed on the executable graphical model.

8. The method of claim 1, wherein the static analysis is performed on a textual model associated with the executable graphical model.

9. The method of claim 1, further comprising:
providing the project manifest to version control software.

10. The method of claim 1, further comprising:
transferring the at least one file referenced by the project and the project manifest to a second IDE;
examining the project manifest in the second IDE; and
identifying at least one file in the project manifest as missing from the second IDE.

11. The method of claim 10, further comprising:
retrieving to the second IDE the file identified as missing from the second IDE from a location outside the second IDE.

12. The method of claim 11, further comprising:
executing the at least one file referenced by the project in the second IDE using at least one file in the project manifest.

13. The method of claim 1, further comprising:
subtracting, automatically, without user intervention, at least one selected file from the project manifest, the at least one selected file subtracted from the project manifest after automatically comparing one of a name, a version and an author of the selected file to the files in the project manifest and identifying presence of the selected file in the files provided by the project manifest.

14. The method of claim 1, wherein the task performed on the at least one file is performance of a coverage report on the executable graphical model.

15. A system comprising:
a processor to:
retrieve at least one file referenced by a project into an Integrated Development Environment (IDE), where:
the project includes a plurality of file dependencies,
the project is associated with an executable graphical model being developed in the IDE,
the project has a project manifest, the project manifest identifying files associated with the project, and
the project is executable when associated with the project manifest;
execute a verification facility that examines a plurality of files associated with the at least one file referenced by the project, where:
the plurality of files includes files required to execute the project and files not-required to execute the project,
the examining identifies a filtered set of files from the files required to execute the project and the files not-required to execute the project;
add the filtered set of files to the project manifest, where the project verification facility:
automatically performs, without user intervention, a static analysis of the at least one file referenced by the project,
automatically identify, without user intervention, at least one additional file not included in the filtered set of files, the automatically identifying based on the static analysis, the automatically identifying comprising:
retrieving, from storage, the project manifest, and
adding the at least one additional file, not included in the filtered set of files, to the project manifest, where the project is executable prior to and after the automatic addition of the at least one additional file, not included in the filtered set of files, to the project manifest;
automatically identify, without user intervention, at least one IDE-selected file, the least one IDE-selected file created based on performing a task on the at least one file referenced by the project; and
automatically add, without user intervention, the at least one IDE-selected file to the project manifest, the project being executable when the at least one IDE-selected file is in the project manifest.

16. The system of claim 15, wherein the processor is further configured to:
add the at least one IDE-selected file to the project manifest after automatically comparing, without user intervention, a name of the IDE-selected file to the files in the project manifest and identifying absence of the IDE-selected file in the files in the project manifest.

17. The system of claim 15, wherein the processor is further configured to:
add a group of files identified by a label to the project manifest.

18. The system of claim 15, wherein the processor is further configured to:
perform the static analysis on one of the executable graphical model and a textual model associated with the executable graphical model.

19. The system of claim 15, wherein the project manifest includes at least one metatag.

20. The system of claim 19, wherein the at least one metatag indicates one of a default model and a top model.

21. The system of claim 15, wherein the task performed on the at least one file is performance of a coverage report on the executable graphical model that creates at least one file.

22. A non-transitory computer-readable medium storing:
one or more instructions that, when executed by a processor, cause the processor to:
obtain in an Integrated Development Environment (IDE) at least one file referenced by a project, where:
the at least one file includes a plurality of file dependencies,
the project is associated with an executable graphical model being developed in the IDE,
the project has a project manifest, the project manifest identifying files associated with the project, and
the project is executable when associated with the project manifest;
examine, with a verification facility in the IDE, a plurality of files associated with the at least one file referenced by the project, the plurality of files including files required to execute the project and files not-required to execute the project, the examining comprising:
identifying a filtered set of files from the files required to execute the project and the files not-required to execute the project;
add the filtered set of files to the project manifest;
automatically perform, without user intervention, a static analysis of the at least one file referenced by the project;
automatically identify, without user intervention, at least one additional file not included in the filtered set of files, the automatically identifying based on the static analysis, the automatically identifying comprising:
retrieving, from storage, the project manifest, and
adding the at least one additional file, not included in the filtered set of files, to the project manifest, where the project is executable prior to and after the automatic addition of the at least one additional file, not included in the filtered set of files, to the project manifest;
automatically identify, without user intervention, at least one IDE-selected file, the least one IDE-selected file created based on performing a task on the at least one file referenced by the project; and automatically add, without user intervention, the at least one IDE-selected file to the project manifest, the project being executable when the at least one IDE-selected file is in the project manifest.

23. The medium of claim 22, further storing:
one or more instructions that, when executed by the processor, cause the processor to:
add at least one user-selected file to the project manifest.

24. The medium of claim 22, wherein the at least one IDE-selected file is added to the project manifest after automatically comparing, without user intervention, a name of the IDE-selected file to the files in the project manifest and identifying absence of the IDE-selected file from the files in the project manifest.

25. The medium of claim 22, wherein a group of files identified by a label is added to the project manifest.

26. The medium of claim 25, wherein the label identifies one of an application, an application plug-in, a toolbox and a blockset.

27. The medium of claim 26, wherein the label also identifies a version identifier for one of the application, the application plug-in, the toolbox and the blockset.

28. The medium of claim 22 wherein the static analysis is performed on one of the executable graphical model and a textual model associated with the executable graphical model.

29. The medium of claim 22, further storing:
one or more instructions that, when executed by the processor, cause the processor to:
provide the project manifest to version control software.

30. The medium of claim 22, further storing:
one or more instructions that, when executed by the processor, cause the processor to:
transfer the at least one file referenced by the project and the project manifest to a second IDE;
examine the project manifest in the second IDE; and
identify at least one file listed in the project manifest as missing from the second IDE.

31. The medium of claim 30, further storing:
one or more instructions that, when executed by the processor, cause the processor to:
retrieve to the second IDE the file identified as missing from the second IDE from a location outside the second IDE.

32. The medium of claim 31, further storing:
one or more instructions that, when executed by the processor, cause the processor to:
execute the at least one file referenced by the project in the second IDE using at least one file in the project manifest.

33. The medium of claim 22, wherein the task performed on the at least one file is performance of a coverage report on the executable graphical model.

34. A system comprising:
a processor executing instructions to:
obtain, in an Integrated Development Environment (IDE), at least one file referenced by a project, where:
the at least one file includes a plurality of file dependencies,
the project is associated with an executable graphical model being developed in the IDE,
the project has a project manifest, the project manifest identifying files associated with the project, and
the project is executable when associated with the project manifest;
examine, with a verification facility in the IDE, a plurality of files associated with the at least one file referenced by the project, the plurality of files including files required to execute the project and files not-required to execute the project, the examining comprising:
identifying a filtered set of files from the files required to execute the project and the files not-required to execute the project;
add the filtered set of files to the project manifest;
automatically perform, without user intervention, a static analysis of the at least one file referenced by the project;
automatically identify, without user intervention, at least one additional file not included in the filtered set of files, the automatically identifying based on the static analysis, the automatically identifying comprising:
retrieving, from storage, the project manifest, and
adding the at least one additional file, not included in the filtered set of files, to the project manifest, where the project is executable prior to and after the automatic addition of the at least one additional file, not included in the filtered set of files, to the project manifest;
automatically identify, without user intervention, at least one IDE-selected file, the least one IDE-selected file created based on performing a task on the at least one file referenced by the project; and
automatically add, without user intervention, the at least one IDE-selected file to the project manifest, the project being executable when the at least one IDE-selected file is in the project manifest.

35. The system of claim 34, wherein the processor further executes instructions to:
add at least one user-selected file to the project manifest.

36. A computing device-implemented method comprising:
obtaining in an Integrated Development Environment (IDE) an executable graphical model referenced by a project, where:
the executable graphical model includes a plurality of file dependencies,
the project has a project manifest, the project manifest identifying files associated with the project, and
the project is executable when associated with the project manifest;
examining, with a verification facility in the IDE, a plurality of files associated with the executable graphical model, the plurality of files including files required to execute the project and files not-required to execute the project, the examining including:
identifying a filtered set of files from the files required to execute the project and the files not-required to execute the project;
adding the filtered set of files to the project manifest;
automatically performing, without user intervention, a static analysis of the executable graphical model;
automatically identifying, without user intervention, at least one additional file not included in the filtered set of files, the automatically identifying based on the static analysis, the automatically identifying comprising:
retrieving, from storage, the project manifest, and
adding the at least one additional file, not included in the filtered set of files, to the project manifest, where the project is executable prior to and after the automatic addition of the at least one additional file, not included in the filtered set of files, to the project manifest;

adding at least one user-selected file to the project manifest; and automatically identifying, without user intervention, at least one IDE-selected file, the least one IDE-selected file created based on performing a task on the at least one file referenced by the project; and automatically adding, without user intervention, the at least one IDE-selected file to the project manifest, the project being executable when the at least one IDE-selected file is in the project manifest.

37. The method of claim 36, wherein the task performed on the at least one file is performance of a coverage report on the executable graphical model.

38. A computing device-implemented method comprising:
obtaining, with a computing device, at least one file referenced by a project, where:
the at least one file includes a plurality of file dependencies,
the project is associated with an executable graphical model,
the project has a project manifest, the project manifest identifying files associated with the project, and
the project is executable when associated with the project manifest;
examining, with a verification facility in the computing device, a plurality of files associated with the at least one file referenced by the project, the plurality of files including files required to execute the project and files not-required to execute the project, the examining comprising:
identifying a filtered set of files from the files required to execute the project and the files not-required to execute the project;
adding the filtered set of files to the project manifest;
automatically performing, without user intervention, a dynamic analysis of the at least one file referenced by the project;
automatically identifying, without user intervention, at least one additional file not included in the filtered set of files, the automatically identifying based on the dynamic analysis, the automatically identifying comprising:
retrieving, from storage, the project manifest, and
adding the at least one additional file, not included in the filtered set of files, to the project manifest, where the project is executable prior to and after the automatic addition of the at least one additional file, not included in the filtered set of files, to the project manifest;
automatically identifying, without user intervention, at least one selected file, the least one selected file created based on performing a task on the at least one file referenced by the project; and
automatically adding, without user intervention, at least one selected file to the project manifest, the project being executable when the at least one selected file is in the project manifest.

39. The method of claim 38, wherein the task performed on the at least one file is performance of a coverage report on the executable graphical model.

40. A computing device-implemented method comprising:
obtaining at least one file referenced by a project, where:
the at least one file includes at least one file dependency,
the project is associated with an executable graphical model,
the project has a project manifest, the project manifest identifying files associated with the project, and
the project is executable when associated with the project manifest;
examining with a verification facility executing in a computing device a list of files associated with the project, the files including files required to execute the project and files not-required to execute the project, the examining comprising:
identifying a filtered set of files from the files required to execute the project and the files not-required to execute the project;
adding the filtered set of files added to the project manifest;
automatically performing, without user intervention, a static analysis of the at least one file referenced by the project;
automatically identifying, without user intervention, at least one additional file not included in the filtered set of files, the automatically identifying based on the static analysis, the automatically identifying comprising:
retrieving, from storage, the project manifest, and
adding the at least one additional file, not included in the filtered set of files, to the project manifest, where the project is executable prior to and after the automatic addition of the at least one additional file, not included in the filtered set of files, to the project manifest;
automatically identifying, without user intervention, at least one selected file, the least one selected file created based on performing a task on the at least one file referenced by the project; and
automatically adding, without user intervention, the at least one selected file to the project manifest, the project being executable when the at least one IDE-selected file is in the project manifest.

41. The method of claim 40, wherein at least one file identified by the static analysis is not added to the project manifest because of being listed on an exclusion list.

42. The method of claim 40, wherein the task performed on the at least one file is performance of a coverage report on the executable graphical model.

* * * * *

UNITED STATES PATENT AND TRADEMARK OFFICE
CERTIFICATE OF CORRECTION

PATENT NO. : 8,719,766 B1  
APPLICATION NO. : 11/582064  
DATED : May 6, 2014  
INVENTOR(S) : Gavin William Walker et al.

Page 1 of 1

It is certified that error appears in the above-identified patent and that said Letters Patent is hereby corrected as shown below:

On the Title Page, (73) Assignee, replace "The Math Works, Inc." with --The MathWorks, Inc.--

In the Claims

Column 10, line 28 (in Claim 21), delete "that creates at least one file"

Signed and Sealed this  
Ninth Day of December, 2014

Michelle K. Lee  
*Deputy Director of the United States Patent and Trademark Office*